(12) United States Patent
Freerksen et al.

(10) Patent No.: US 6,351,791 B1
(45) Date of Patent: Feb. 26, 2002

(54) CIRCUIT ARRANGEMENT AND METHOD OF MAINTAINING CACHE COHERENCE UTILIZING SNOOP RESPONSE COLLECTION LOGIC THAT DISREGARDS EXTRANEOUS RETRY RESPONSES

(75) Inventors: Donald Lee Freerksen, Rochester; Gary Michael Lippert, Kasson; Farnaz Mounes-Toussi, Minneapolis, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/104,588

(22) Filed: Jun. 25, 1998

(51) Int. Cl.[7] .......................... G06F 12/00; G06F 13/00
(52) U.S. Cl. ..................... 711/146; 711/122; 711/141; 711/144
(58) Field of Search ................................ 711/141, 146, 711/144, 110, 122, 100, 118

(56) References Cited

U.S. PATENT DOCUMENTS

| | | | | |
|---|---|---|---|---|
| 5,561,779 A | * | 10/1996 | Jackson et al. | 711/122 |
| 5,715,428 A | * | 2/1998 | Wang et al. | 711/141 |
| 5,822,765 A | * | 10/1998 | Boatright et al. | 711/146 |
| 5,860,114 A | * | 1/1999 | Sell | 711/146 |
| 5,893,151 A | * | 4/1999 | Merchant | 711/140 |
| 5,966,728 A | * | 10/1999 | Amini et al. | 711/146 |

\* cited by examiner

Primary Examiner—Tuan V. Thai
(74) Attorney, Agent, or Firm—Wood, Herron & Evans

(57) ABSTRACT

A data processing system, circuit arrangement, integrated circuit device, program product, and method improve system response by disregarding extraneous retry signals during the generation of a prioritized response signal from the response signals output from various snooper devices coupled to one another over a shared memory interface. In particular, it has been determined that a subset of retry signals issued by various snooper devices that snoop memory access requests do not have any a bearing upon the ultimate determination of whether or not a particular memory address, or cache line therefor, is stored in any of the snooper devices. As a result, by disregarding these extraneous retry signals, such access requests may be permitted to proceed without having to be reissued, thereby minimizing the time required to process such requests, and eliminating the extraneous traffic that would otherwise be present on the interface. Extraneous retry signals may be disregarded, for example, by prioritizing to a higher relative priority any response signal that indicates that information from a memory address, or cache line therefor, is stored in a single snooper device. As another example, response signals that indicate that the information from a requested memory address is stored in multiple snooper devices may also be prioritized relative to a retry signal if the request will not modify the information in the memory address.

39 Claims, 5 Drawing Sheets

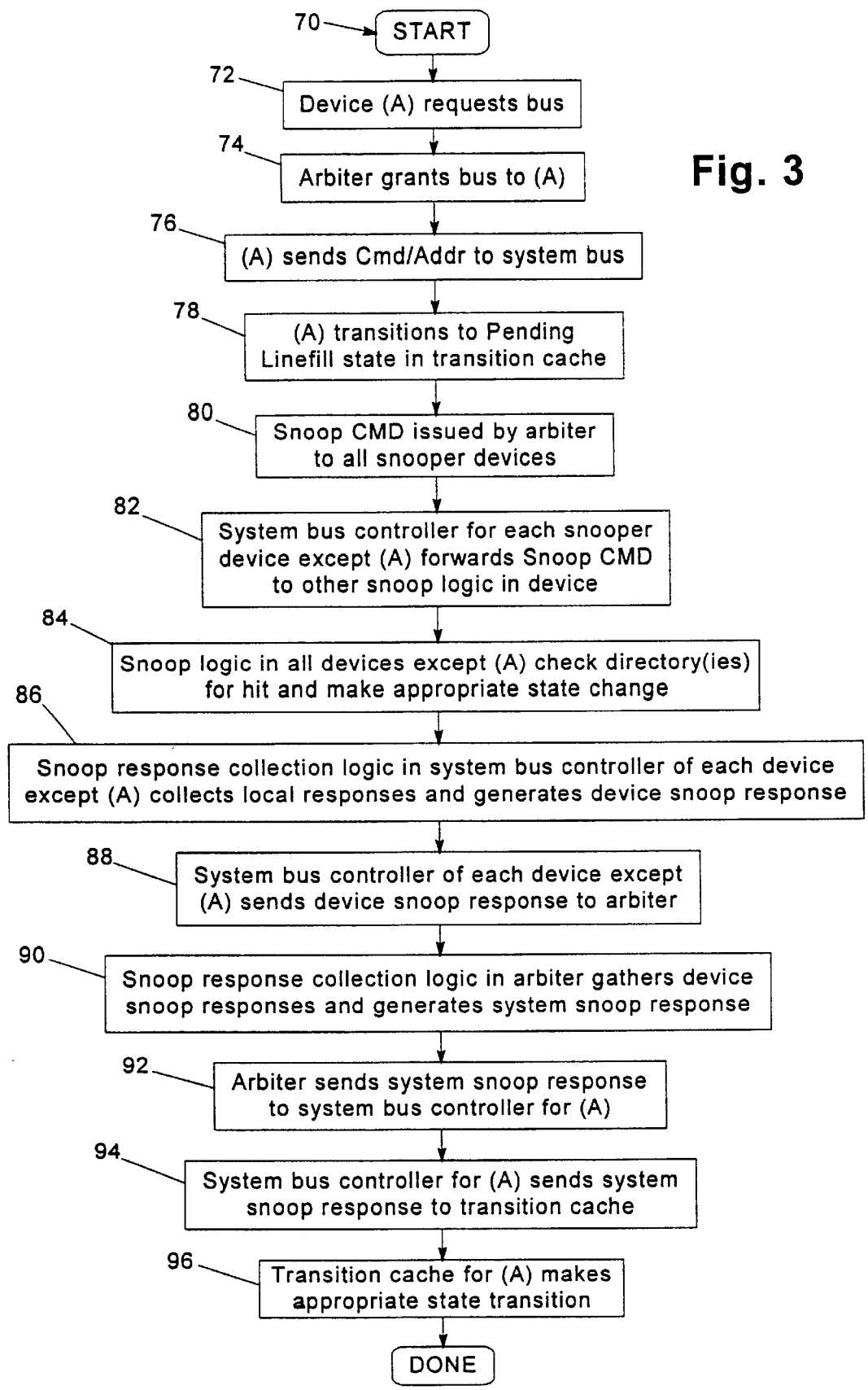

CIRCUIT ARRANGEMENT AND METHOD OF MAINTAINING CACHE COHERENCE UTILIZING SNOOP RESPONSE COLLECTION LOGIC THAT DISREGARDS EXTRANEOUS RETRY RESPONSES

FIELD OF THE INVENTION

The invention is generally related to cache coherence in a shared memory architecture, and in particular to response collection in a snoopy cache coherence implementation.

BACKGROUND OF THE INVENTION

Computer technology continues to advance at a remarkable pace, with numerous improvements being made to the performance of both microprocessors—the "brains" of a computer—and the memory that stores the information processed by a computer.

In general, a microprocessor operates by executing a sequence of instructions that form a computer program. The instructions are typically stored in a memory system having a plurality of storage locations identified by unique memory addresses. The memory addresses collectively define a "memory address space," representing the addressable range of memory addresses that can be accessed by a microprocessor.

Both the instructions forming a computer program and the data operated upon by those instructions are often stored in a memory system and retrieved as necessary by the microprocessor when executing the computer program. The speed of microprocessors, however, has increased relative to that of memory devices to the extent that retrieving instructions and data from a memory can often become a significant bottleneck on performance. To decrease this bottleneck, it is desirable to use the fastest available memory devices possible, e.g., static random access memory (SRAM) devices or the like. However, both memory speed and memory capacity are typically directly related to cost, and as a result, many computer designs must balance memory speed and capacity with cost.

A predominant manner of obtaining such a balance is to use multiple "levels" of memories in a memory system to attempt to decrease costs with minimal impact on system performance. Often, a computer relies on a relatively large, slow and inexpensive mass storage system such as a hard disk drive or other external storage device, an intermediate main memory that uses dynamic random access memory devices (DRAM's) or other volatile memory storage devices, and one or more high speed, limited capacity cache memories, or caches, implemented with SRAM's or the like. One or more memory controllers are then used to swap the information from segments of memory addresses, often known as "cache lines", between the various memory levels to attempt to maximize the frequency that requested memory addresses are stored in the fastest cache memory accessible by the microprocessor. Whenever a memory access request attempts to access a memory address that is not cached in a cache memory, a "cache miss" occurs. As a result of a cache miss, the cache line for a memory address typically must be retrieved from a relatively slow, lower level memory, often with a significant performance hit.

Another manner of increasing computer performance is to use multiple microprocessors operating in parallel with one another to perform different tasks at the same time. Often, the multiple microprocessors share at least a portion of the same memory system to permit the microprocessors to work together to perform more complex tasks. The multiple microprocessors are typically coupled to one another and to the shared memory by a system bus or other like interconnection network. By sharing the same memory system, however, a concern arises as to maintaining "coherence" between the various memory levels in the shared memory system.

For example, in a given multi-processor environment, each microprocessor may have one or more dedicated cache memories that are accessible only by that microprocessor, e.g., level one (L1) data and/or instruction cache, a level two (L2) cache, and/or one or more buffers such as a line fill buffer and/or a transition buffer. Moreover, more than one microprocessor may share certain caches as well. As a result, any given memory address may be stored from time to time in any number of places in the shared memory system.

A number of different mechanisms exist for maintaining coherence within a shared memory system, including among others a directory-based coherence mechanism and a snoopy coherence mechanism. The directory-based coherence mechanism maintains a shared directory of the location of different memory addresses in the shared memory system. However, this mechanism may induce bottlenecks given that most if not all memory access requests need to access the same directory to determine the location of a given memory address.

The snoopy coherence mechanism, on the other hand, in effect distributes the determination of where a given memory address resides among multiple possible memories to snoop logic distributed among and associated with the memories themselves. As such, at least the mechanism that maintains the state information for a memory, e.g., a directory, and the associated snoop logic that updates the state information in response to a memory access request and/or returns a response to the request, is also cooperatively referred to in this context as a "snooper" device. Whenever a memory access request is issued by a given device on a bus, dedicated logic in those snooper devices "snoop" the request and determine whether the cache line for a memory address specified by the request is stored in any of the devices. Typically, if a snooper device has a valid copy of the cache line, that device outputs the cache line to the system bus for access by the requesting device. In some embodiments, "intervention" is also supported, where a snooper device is able to output a cache line directly to a requesting device, e.g., by passing data through the system bus, or even bypassing the system bus altogether.

Another important aspect of the snoopy coherence mechanism, however, is that all possible sourcing devices need to know which device will be handling a memory access request, to prevent more than one device from attempting to handle the request. Yet another important aspect is that all of the snooper devices must update their status information regarding the cache line in response to fulfilling of the request. Therefore, in response to a request, each of the snooper devices must update its status information and output a response indicating the status of the cache line in the device. The responses are then collected and a single response is returned to the requesting device to inform the requesting device of the status of the information being requested.

One conventional snoopy coherence mechanism uses a MESI coherence protocol that tags information stored in a snooper device as one of four states: Modified, Exclusive, Shared, or Invalid. The modified state indicates that the requested cache line is stored in the snooper device, and that the device has the most recent copy thereof—i.e., all other copies, if any, are no longer valid. The Exclusive state indicates that the requested cache line is stored only in the snooper device, but has not been modified relative to the copy in the shared memory. The Shared state indicates that the requested cache line is stored in the snooper device, but that other valid copies of the cache line also exist in other devices. The Invalid state indicates that the cache line is not stored in the snooper device.

If, in response to receipt of a request, a snooper device is capable of determining the state of a cache line, the state is returned with the appropriate response. However, if for some reason the snooper device is unable to determine the state of the cache line, the snooper device typically returns a "Retry" response instead, indicating the failure to process the request. Reasons for returning a Retry response may include, for example, no snoop buffer being available in the snooper device, the snooper device being busy with another operation, or colliding bus transactions, among others.

The various responses from the snooper devices in a shared memory system are typically collected by snoop response collection logic to generate a prioritized snoop response signal that is returned to the requesting device. In a conventional MESI protocol snoopy coherence mechanism, Retry responses are granted the highest priority, followed in order by Modified, Shared, Exclusive and Invalid responses. Conventional collection logic waits until each snooper device returns a response, and then returns the highest priority response among all of the returned responses.

If a Retry response is returned to a requesting device, the device is required to reissue the request to attempt to obtain a non-Retry response. By prioritizing Retry responses relative to other responses, the greatest degree of correctness is ensured for the system, since a non-Retry response will not be returned until all snooper devices have had the opportunity to complete processing of a request.

Reissued requests often take longer to complete, and thus decrease system performance. Moreover, reissued requests typically introduce more traffic on the system bus, thereby further decreasing performance. Therefore, it is often desirable to minimize the number of reissued requests whenever possible to minimize the adverse impact associated with such requests.

Conventional snoopy coherence mechanisms, however, prioritize all Retry responses generated by snooper devices, irrespective of whether the requested cache line could even be stored in the snooper device causing the Retry response. In particular, it has been found that a significant percentage of Retry responses issued by snooper devices have no bearing on the ultimate handling of a request by the other snooper devices. For example, a request may be issued for a particular cache line that is stored solely in a given snooper device. Even though that snooper device may be able to immediately process the request and return a non-Retry response, the fact that another snooper device is busy and unable to process the request will result in a Retry response being returned to the requesting device, and thus reissuance of the request. The fact that it is known that the busy snooper device could not have a copy of the cache line at that time is immaterial to a conventional snoopy coherence mechanism.

Such "extraneous" retry responses therefore needlessly slow response time and increase system bus traffic, and thus decrease overall system performance. A significant need therefore exists for a manner of decreasing or eliminating the occurrence of extraneous retry responses in a snoopy coherence mechanism.

SUMMARY OF THE INVENTION

The invention addresses these and other problems associated with the prior art by providing a data processing system, circuit arrangement, integrated circuit device, program product, and method that disregard extraneous retry signals during the generation of a prioritized response signal from the response signals output from various snooper devices coupled to one another over a shared memory interface. In particular, it has been determined that a subset of retry signals issued by various snooper devices that snoop memory access requests do not have any bearing upon the ultimate determination of whether or not a particular memory address, or cache line therefor, is stored in any of the snooper devices. As a result, by disregarding these extraneous retry signals, such access requests may proceed without having to be reissued, thereby minimizing the time required to process such requests, and eliminating the extraneous traffic that would otherwise be present on the interface. System performance is consequently enhanced in such instances.

In certain embodiments of the invention, for example, extraneous retry signals are disregarded by prioritizing to a higher relative priority any response signal that indicates that information from a memory address, or cache line therefor, is stored in a single snooper device. In particular, when it is known that a valid copy of the information from a particular memory address can be found in a specific snooper device, the fact that another snooper device is unable to determine its state is irrelevant, since it is already known by virtue of the state of that specific snooper device that the other snooper device cannot have a valid copy of the information from the memory address. In other embodiments, response signals that indicate that the information from a requested memory address is stored in multiple snooper devices may also be prioritized relative to a retry signal if the request will not modify the information in the memory address, as the fact that another snooper device is unable to determine its state is also irrelevant in this circumstance. Other manners of disregarding extraneous retry signals will hereinafter become apparent to one of ordinary skill in the art.

Therefore, consistent with one aspect of the invention, coherence is maintained between a plurality of snooper devices coupled to one another over a shared memory interface. In response to receipt of an access request for a selected memory address, a plurality of local response signals are generated, with each local response signal associated with the state of the selected memory address in one of the snooper devices. A retry signal is generated as the local response signal for a selected snooper device when the state of the selected memory address in the selected snooper device cannot be determined. Furthermore, a prioritized response signal is generated representative of a highest priority local response signal among the plurality of local response signals, with any extraneous retry signal disregarded when the prioritized response signal is generated.

Consistent with another aspect of the invention, coherence is maintained between a plurality of snooper devices coupled to one another over a shared memory interface. In response to receipt of an access request for a selected memory address, a plurality of local response signals are generated, with each local response signal indicating one of a plurality of states for the selected memory address in an associated snooper device among the plurality of snooper devices. The plurality of states includes a non-shared state that indicates that the selected memory address is cached solely in the associated snooper device, a retry state that indicates that the snoop logic is unable to determine the state of the selected memory address in the associated snooper device, and a non-cached state that indicates that the selected memory address is not cached in the associated snooper device. Furthermore, a prioritized response signal is generated indicating a highest priority state among the states of the local response signals generated in response to the access request, with the non-shared state having a higher priority than the retry state, and the retry state having a higher priority than the non-cached state.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 3 is a flowchart illustrating the sequence of operations in performing a memory access operation on the data processing system of FIG. 1.

DETAILED DESCRIPTION

The illustrated implementations of the invention generally operate by disregarding extraneous retry signals generated in response to memory access requests being snooped by a plurality of memories coupled to one another in a shared memory system. In the illustrated embodiment, a unique priority assignment is used when generating a prioritized response signal from the various signals that may be returned in response to a memory access request so that, in certain instances where it is known that a retry signal is extraneous, such retry signals may be disregarded.

Figure 1:
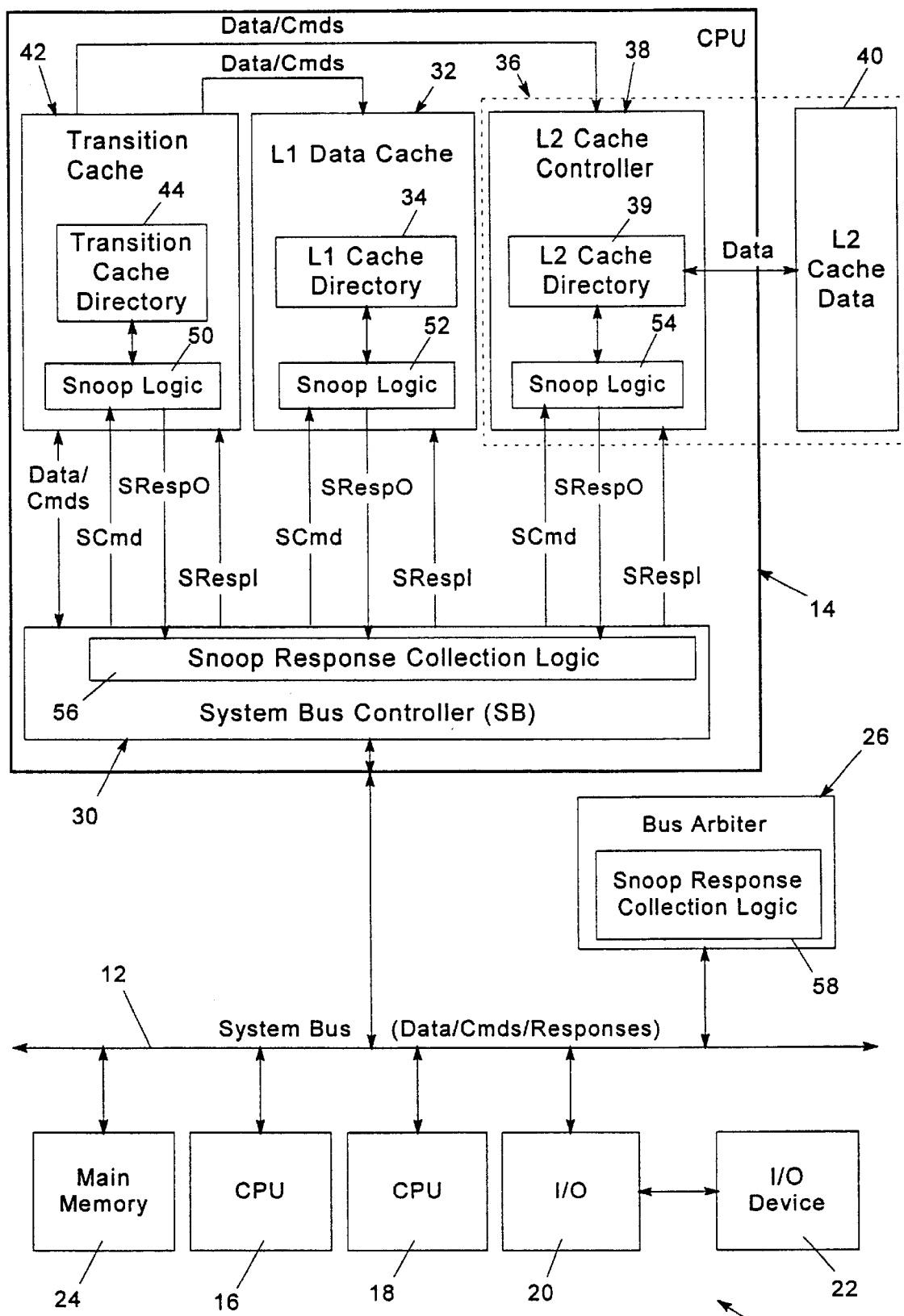
FIG. 1 is a block diagram of a data processing system consistent with the invention.

Turning to the Drawings, wherein like numbers denote like parts throughout the several views, FIG. 1 illustrates the general configuration of an exemplary data processing system 10 consistent with the invention. System 10 generically represents, for example, any of a number of multi-user computer systems such as a network server, a midrange computer, a mainframe computer, etc. However, it should be appreciated that the invention may be implemented in other data processing systems, e.g., in standalone or single-user computer systems such as workstations, desktop computers, portable computers, and the like, or in other computing devices such as embedded controllers and the like. One suitable implementation of data processing system 10 is in a midrange computer such as the AS/400 computer available from International Business Machines Corporation.

Data processing system 10 generally includes a system bus that couples together a plurality of electronic devices, e.g., central processing units (CPU's) 14, 16 and 18, and input/output controller 20—which couples the bus to one or more input/output devices such as I/O device 22—with a shared memory system such as represented by a main memory 24. The data processing system 10 typically includes an addressable memory address space including a plurality of memory addresses. The actual data stored at such memory addresses may be maintained in main memory 24, or may be selectively paged in and out of main memory 24, e.g., into a direct access storage device (DASD) (not shown). Moreover, copies of selective portions of the memory addresses in the memory space may also be duplicated in various memories found in the various electronic devices 14–20 coupled to system bus 12. The system bus acts as a shared memory interface that permits the various electronic devices to share main memory 24 in a controlled fashion, and in this regard, a bus arbiter 26 is typically used to selectively control the access to the bus by each of the electronic devices to prevent collisions between the devices from occurring. In other embodiments, however, it should be appreciated that bus arbitration may be implemented in a distributed manner with suitable logic disposed in each device coupled to the system bus.

For caching purposes, the memory address space is typically also partitioned into a plurality of cache "lines", which are typically contiguous sequences of memory addresses that are always swapped into and out of caches as single units. By organizing memory addresses into defined cache lines, decoding of memory addresses in caches is significantly simplified, thereby significantly improving cache performance. By stating that a sequence of memory addresses forms a cache line, however, no implication is made whether the sequence of memory addresses are actually cached at any given time.

As illustrated by CPU 14, an electronic device typically includes a system bus controller 30 that provides an interface between the system bus and one or more local memories resident in that device. For example, CPU 14 is illustrated as having a level one (L1) data cache 32 with a cache directory 34, a level two (L2) cache 36 with an integrated cache controller 38 and cache directory 39 and an off-chip cache memory device 40, and a transition cache 42 with a cache directory 44. An L1 instruction cache is not illustrated in FIG. 1, and is not relevant to an understanding of the invention. Moreover, it should be appreciated that any of the various caches may be completely integrated into a common integrated circuit device (e.g., with caches 32, 42), or may be partially or completely integrated on separate integrated circuit devices from CPU 14 (e.g., with cache 36). Moreover, it should be appreciated that CPU 14 also utilizes a number of additional components that have been omitted from FIG. 1 for ease of understanding, e.g., an instruction unit, a fixed point unit, a floating point unit, etc. In general, it should be appreciated that a wide variety of suitable hardware implementations may be used in the alternative.

Data processing system 10 implements a snoopy coherence mechanism that permits any device 14–20 to issue memory access requests that may access information stored in any other such device, and in response, updates the state of the memory address(es) in each memory that is affected by the memory access requests. A snoopy coherence mechanism typically includes snoop logic, which receives memory access requests, determines the state of the memory address (es) in each memory that are the subject of the requests, and outputs suitable local response signals representative of the states of the various memories. In addition, such snoop logic may also update the state of a memory address in each memory in response to the request, as discussed in greater detail below.

In the illustrated embodiment, the snoop logic for data processing system 10 is distributed among a plurality of snoop logic circuits that are each associated with a particular memory in the system, e.g., snoop logic circuits 50, 52 and 54, which are respectively associated with transition cache 42, L1 data cache 32 and L2 cache 36. It should be appreciated that similar logic is associated with each memory in each other device coupled to system bus 12. It should also be appreciated that snoop logic circuits may service multiple memories in the alternative, and thus, a one-to-one mapping between snoop logic circuits and memories is not required.

In general, each snoop logic circuit interacts with the directory associated therewith to obtain and/or update the state information regarding a particular memory address specified by a memory access request. Thus, for example, snoop logic circuit 50 is coupled to directory 44 of transition cache 42, snoop logic circuit 52 is coupled to directory 34 of L1 data cache 32, and snoop logic circuit 54 is coupled to directory 39 of L2 cache 36. The combination of snoop logic and a directory or other suitable logic that stores state information about a particular memory in data processing system 10 is also referred to herein as a "snooper" device, which in some implementations may also be considered to further include the control logic and/or memory storage for the particular memory associated with such a device.

It should also be appreciated that any electronic device coupled within a shared memory system may include any number and combination of snooper devices for which it is desirable to maintain coherence with other snooper devices in the system. Examples of suitable snooper devices include any level of cache memory whether for instructions, data or both; transition cache memories or buffers; microprocessor registers; bus agents; bus adapters; bus bridges; input/output (I/O) controllers; and/or various additional buffers and registers implemented in an electronic device. An electronic device, or an integrated circuit device therein, may include one or more snooper devices, and it should be appreciated that the invention may also be utilized in connection with multiple snooper devices integrated into the same integrated circuit device to maintain coherence within the various memories internal to that integrated circuit device. Other modifications will be apparent to one of ordinary skill in the art.

A snoopy coherence mechanism consistent with the invention also includes snoop response collection logic, which gathers the local response signals from the snoop logic circuits of the various snooper devices and generates a prioritized response signal representative of the highest priority local response signal. In the illustrated embodiment, the functionality of the snoop response collection logic is distributed between device-or chip-level snoop response collection logic circuits such as snoop response collection logic circuit 56, and a system-level snoop response collection logic circuit 58 resident in bus arbiter 26.

In this implementation, each chip-level circuit generates a chip response signal from the local response signals output by the various snoop logic circuits on the integrated circuit device. Then, the system-level circuit collects the chip response signals and generates therefrom an overall system response signal. To this extent, it may be seen that in some implementations an electronic device that includes multiple snooper devices integrated therein may itself be considered to be a single snooper device for the purposes of interfacing with other components in the system, e.g., where snoop response collection logic circuit 56 in CPU 14 combines the local response signals from snoop logic circuits 50, 52 and 54 to output a single response signal for interaction with bus arbiter 26.

Other hardware implementations of the snoop response collection logic may be used in the alternative. For example, a single logic circuit may be used to collect the local response signals from multiple integrated circuit devices and generate the system response signal. Also, such a circuit may be disposed in other integrated circuit devices than the bus arbiter. Furthermore, duplicate snoop collection logic may be disposed in the various integrated circuit devices to localize the generation of the system response signal as desired.

As should be apparent from the foregoing, an innumerable number of alternate hardware arrangements may be utilized to implement a snoopy coherence mechanism consistent with the invention. Moreover, as is well known in the art, integrated circuit devices are typically designed and fabricated using one or more computer data files, referred to herein as hardware definition programs, that define the layout of the circuit arrangements on the devices. The programs are typically generated by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. While the invention has and hereinafter will be described in the context of circuit arrangements implemented in fully functioning integrated circuit devices and data processing systems utilizing such devices, those skilled in the art will appreciate that circuit arrangements consistent with the invention are also capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others and transmission type media such as digital and analog communications links.

As is well known in the field of snoopy coherence, whenever a device coupled to the system bus desires to access a specific memory address, the device issues a request to the bus arbiter for control of the bus. In some implementations, the issuance of a memory access request may not be issued on the bus until after verifying whether or not the memory access request may be processed by a local memory in the device.

Figure 2:
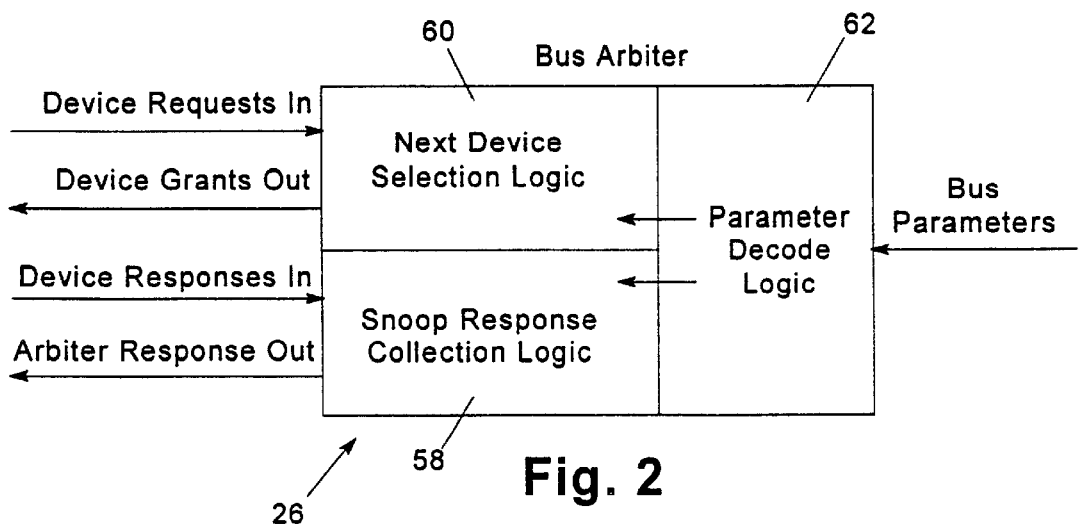
FIG. 2 is a block diagram of the bus arbiter of FIG. 1.

As illustrated in FIG. 2, bus arbiter 26 typically includes, in addition to the snoop response collection logic 58, a next device selection logic circuit 60 that receives requests from the various devices and grants to one such device control of the bus. The bus arbiter also receives bus parameters into a parameter decode logic circuit 62 that is used to determine the timing relationships between requests, grants, and responses.

FIG. 3 illustrates at 70 the sequence of operations in handling a memory access request with the snoopy coherence mechanism illustrated herein. Only the operations that implement snoopy coherence are illustrated in FIG. 3; the operations associated with transferring data to a requesting device to fulfill a memory access request are not separately illustrated herein. Such operations, however, are generally well known in the art, and thus no further discussion thereof is provided herein.

It is assumed for this exemplary sequence of operations that device (A) implements a transition cache, as well as at least one of an L1 and L2 cache, similar to CPU device 14 of FIG. 1. Handling of a memory access request begins at block 72 by a device, designated herein by the designation "(A)", requesting control of the bus via a Device Request In line passed to next device collection logic 60 of bus arbiter 26 (FIG. 2). As discussed above, the memory access request over the bus is typically issued if no local memory in the device is capable of handling the request.

Next, in block 74, the arbiter grants the bus to device (A) via the Device Grant Out line from logic 60 of arbiter 26 (FIG. 2). Once device (A) receives control of the bus, the device sends the command and address for the memory access request to the system bus in block 76. Typically, the memory access request includes an access type, such as READ or WRITE, and the address being specified for the request. The protocol for and the format of a memory access request will vary for different hardware environments, and in any event, is generally well understood in the art.

Next, in block 78, the transition cache in device (A) transitions to a "pending linefill" state to indicate that the access request is pending. Next, in block 80, the arbiter issues a snoop command to all snooper devices on the bus, e.g., devices 16–20 in FIG. 1. Next, in block 82, the system bus controller for each snooper device except device (A) forwards the snoop command to the snoop logic in each device to access the state information in the various memories in each device.

Next, in block 84, the snoop logic in all the devices except device (A) checks the various directories in the device for cache hits and makes the appropriate state changes. In addition, the snoop logic generates one or more local response signals and outputs those signals to the snoop response collection logic in each device.

The state information in the various directories in a device may include any number of known protocols, e.g., the MESI protocol. Maintaining and updating state information, as well as generating appropriate snoop response signals for a given protocol, is generally well understood in the art. For example, for the MESI protocol, in response to a WRITE request or other request that modifies a cache line, typically the state information for each memory having a valid copy of the cache line specified by the request will transition to an "invalid" state, because as a result of the processing of the request, the requesting device will retrieve the cache line and thereafter modify that cache line such that it is the only valid copy existing in the system. Moreover, in response to a READ request, if a particular memory has an exclusive or modified copy of a cache line, a READ request will typically transition the state information for the memory to a "shared" state, as the requesting device will receive as a result of a request another valid copy of the cache line specified in the request.

Next, in block 86, the snoop response collection logic in the system bus controller of each device except device (A) collects the snoop responses generated by the snoop logic in each device. Based upon these responses, the snoop response collection logic in the system bus controller generates a device-level snoop response. Generation of an appropriate prioritized response signal for the device-level snoop response is described in greater detail below in connection with FIG. 5.

In turn, the system bus controller of each device except device (A) sends this device-level snoop response signal to the arbiter in block 88. Then, in block 90, the snoop response collection logic in the arbiter gathers these device-level snoop responses and generates therefrom a system-level snoop response signal, the generation of which is also described in greater detail below in connection with FIG. 5. This signal is then sent to the system bus controller for device (A) in block 92, which in turn sends the response to the transition cache for the device in block 94. Based upon the signal supplied to the transition cache, the transition cache for device (A) makes an appropriate state transition in block 96, whereby the coherency protocol is complete.

As an additional matter, it may also be desirable to perform some error checking based upon the system-level snoop response returned by the snoop response collection logic in the bus arbiter. For example, it is known that the priority of the system-level snoop response returned to each device should always be greater than or the same as the device-level snoop response output by each such device. Thus, it may be desirable to compare, in the system bus controller of each device, whether the system-level snoop response is greater than or equal to the device-level snoop response output by the snoop response collection logic of that device. If not, an error in the bus arbiter has likely occurred.

Figure 4:
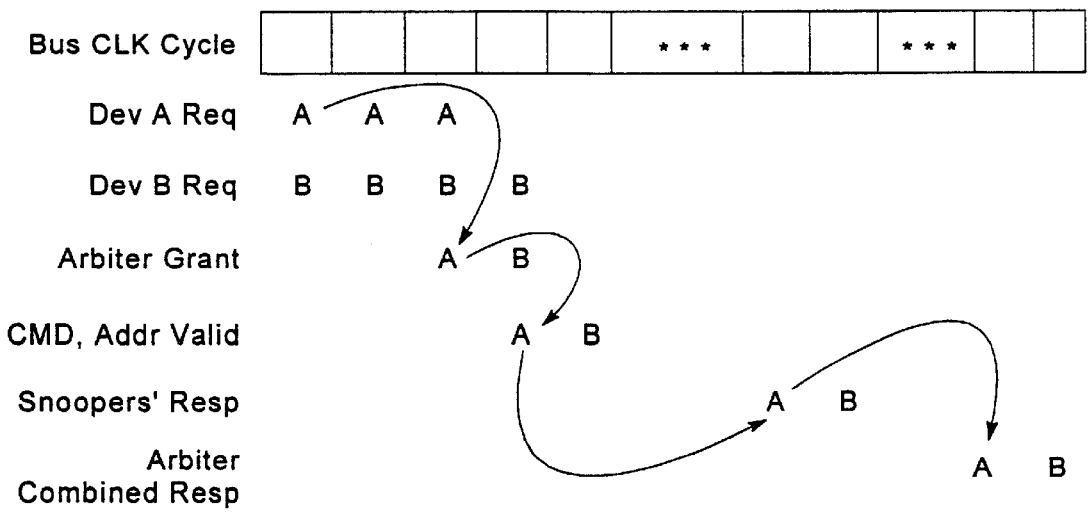
FIG. 4 is a timing diagram illustrating the timing of the sequence of operations performed in FIG. 3.

FIG. 4 illustrates an exemplary timing of the operations that occur when two devices (A) and (B) attempt to simultaneously issue memory access requests over the system bus in the manner described above. It may be seen in this figure that the requests by device (A) and device (B) are pipelined by the arbiter to speed system access. Thus, in successive cycles, the arbiter grants access to the bus to devices (A) and (B), with those devices applying the memory access requests on the bus one cycle later, and with the response from the snooper devices and the combined response from the arbiter being supplied at indeterminate times several cycles from when the memory access requests are placed on the bus. By pipelining the memory access requests in this manner, system bus bandwidth is improved since other operations occur while the snoop response collection logic of each device generates the appropriate snoop response signals to requesting devices.

Figure 5:
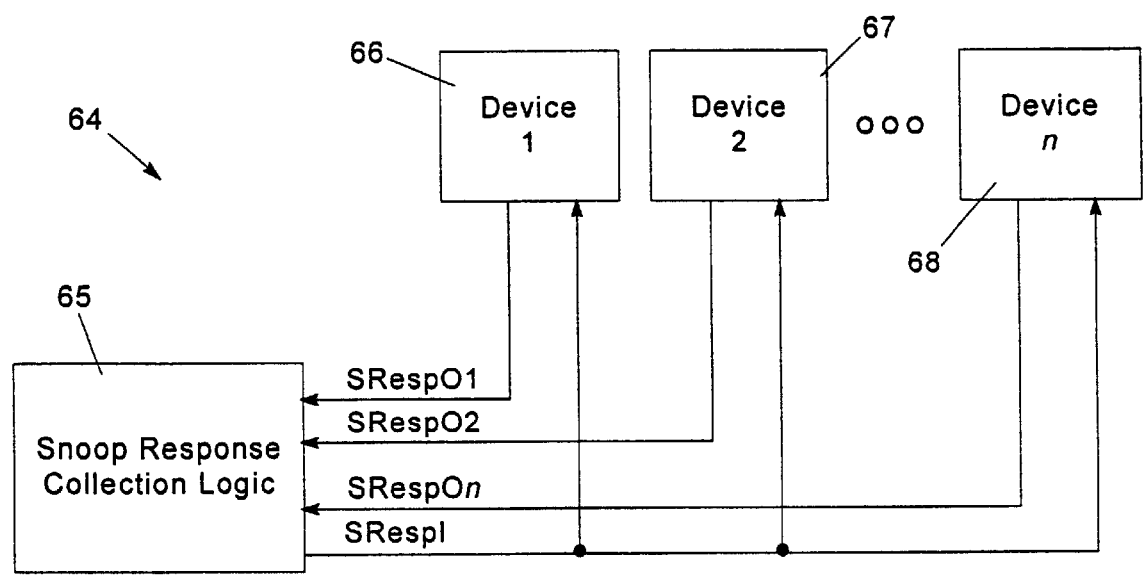
FIG. 5 is a block diagram of the interface between snoop response collection logic and a plurality of devices in a shared memory data processing system consistent with the invention.

As discussed above, the snoop response collection logic circuit in each device, as well as within the bus arbiter, generates a prioritized response signal based upon the response signals supplied as input thereto. Typically, the logic in each snoop response collection logic circuit, e.g., circuits 56, 58 (FIG. 1), operates in a similar manner to generate the overall system-level snoop response signal. FIG. 5 illustrates in a more general way the general operation of each snoop response collection logic circuit utilized in data processing system 10. As shown in this figure, a snoopy coherence mechanism 64 includes snoop response collection logic 65 that is configured to receive snoop response signals from 1 . . . n snooper devices, represented at 66–68. Each snooper device 1 . . . n generates an appropriate local response signal SResp0l . . . SResp0n using suitable snoop logic disposed therein. In turn, the snoop response collection logic returns to each of these devices a single prioritized snoop response, or Response In signal SRespI.

It should be appreciated that snoopy coherence mechanism 64 may represent either of a device-level mechanism or a system-level mechanism. In a device-level mechanism, each device 1 . . . n would represent an integrated snooper device such as that associated with each of caches 32, 36 and 42 of FIG. 1, and snoop response collection logic 65 would represent a circuit such as circuit 56 of FIG. 1. In a system-level mechanism, each device 1 . . . n would represent a snooper device coupled to the system bus such as each device 14–20 of FIG. 1, and snoop response collection logic 65 would represent a circuit such as circuit 58 of FIG. 1. Furthermore, it should be appreciated that each device 1 . . . n in a system-level mechanism may include therein a device-level snoopy coherence mechanism such as mechanism 64.

Snoop response collection logic 65 basically operates by outputting as the prioritized response signal the highest priority response signal received from one of devices 1 . . . n. For example, assuming the use of a MESI protocol, one suitable prioritization of the snoop response signals consistent with the invention is illustrated below in Table I:

TABLE I

| Snoop Response Priority | | |
|---|---|---|
| Priority | Read Req. | Write Req. |
| 1 | Modified | Modified |
| 2 | Shared | Exclusive |
| 3 | Exclusive | Retry |
| 4 | Retry | Shared |
| 5 | Invalid | Invalid |

This prioritization relies on the fact that, for example, if a memory access request is for a READ request, as long as one device is known to have a valid copy of the memory address—that is, if at least one device returns a "cached" signal such as a modified, shared or exclusive response signal—it is known that any retry response received from another device will be extraneous, since the memory access request can be fulfilled by the device that returns the cached signal as its response. Moreover, if the memory access request is a WRITE request, as long as a response is returned indicating that only one device has a cached copy of the memory address specified in the request —that is, if a device returns a "non-shared" signal such as a modified or exclusive response signal—it is known that any retry signal returned from another device will be extraneous because the memory access request can be fulfilled by the device that returns the non-shared signal as its response.

In certain embodiments of the invention, the use of a separate, exclusive response signal may not be required. In such instances, the "predicted" state of the associated device upon processing of the request will transition to one of two alternate states based upon whether the response is for a READ or a WRITE request. In particular, if a READ request is received, it is known that, in response to the READ, the requesting device will also include a valid copy of the cache line, and thus, the exclusive state of the snooper device can immediately transition to the shared state. Similarly, for a WRITE request, the requesting device will obtain a copy of the cache line and subsequently modify that copy, thereby rendering the copy of the cache line in the snooper device invalid. As such, the exclusive state for such a cache line may be transitioned to an invalid state immediately upon receipt of the WRITE request.

By removing the exclusive signal as a valid response signal, an alternate prioritization of the snoop response signals may be utilized, as shown below in Table II:

TABLE II

| Snoop Response Priority (Predictive Response) | | |
|---|---|---|
| Priority | Read Req. | Write Req. |
| 1 | Modified | Modified |
| 2 | Shared | Retry |
| 3 | Retry | Shared |
| 4 | Invalid | Invalid |

It should be appreciated that prioritizing the different cached signals, e.g., shared signals, exclusive signals and/or modified signals, relative to one another may not be required in some embodiments given that in a properly functioning system, the different cached signal types should not be returned together. In particular, in many embodiments it should be expected that, if an exclusive or modified signal is received, all other responses will be invalid or retry responses, since no other device should have a cached copy of the cache line specified in the request. Similarly, if a shared signal is received, the only valid responses from other devices should be shared, invalid or retry signals.

In further embodiments of the invention, it may also be desirable to utilize in the snoop response collection logic a functionality whereby a prioritized response signal is output prior to receipt of all local response signals input to the circuit. It should be appreciated that the prioritization described above with respect to Tables I and II assumes that all responses are received simultaneously, or that, in the least, that the prioritized response signal is not output until all local response signals are received. However, it may be possible in certain circumstances to output a prioritized response signal prior to receipt of all local response signals from the snooper devices to which the snoop response collection logic is coupled. Table III, for example, illustrates a suitable logic table for use with three snooper devices:

TABLE III

| Snoop Response Combining Table (Three Devices) | | | | |
|---|---|---|---|---|
| Local Response Signals | | | Prioritized Response Signal | |
| Device 1 | Device 2 | Device 3 | Read Request | Write Request |
| Shared | — | — | Shared | Wait for all→Shared/Retry |
| — | Shared | — | Shared | Wait for all→Shared/Retry |
| — | — | Shared | Shared | Wait for all→Shared/Retry |
| Exclusive | — | — | Exclusive | Exclusive |
| — | Exclusive | — | Exclusive | Exclusive |
| — | — | Exclusive | Exclusive | Exclusive |
| Modified | — | — | Modified | Modified |
| — | Modified | — | Modified | Modified |
| — | — | Modified | Modified | Modified |
| Retry | Invalid | Invalid | Wait for all→Retry | Wait for all→Retry |
| Invalid | Retry | Invalid | Wait for all→Retry | Wait for all→Retry |
| Invalid | Invalid | Retry | Wait for all→Retry | Wait for all→Retry |
| Invalid | Invalid | Invalid | Wait for all→Invalid | Wait for all→Invalid |

It should also be appreciated that if a predictive state transition occurs in response to snooping a memory access request, the entries in the Table relating to the exclusive response may be omitted as described above with respect to Table II.

As can be seen from this Table, if a non-shared signal such as an exclusive or modified signal is returned as a local response signal, that non-shared signal may be output as the prioritized response signal immediately, and prior to receipt of all other local response signals by the snoop response collection logic. This is because it is known by this time that only one device has a valid copy of the cache line specified in the memory access request, and thus, any retry response generated by another device is extraneous. In addition, for a READ operation, waiting for a response from each device coupled to the snoop response collection logic is not required if any device returns a shared signal as its local response signal. This is because it is known by this time that at least one device has a valid copy of the cache line specified in the memory access request.

However, for a WRITE memory access request, it may be necessary to wait for all devices to return responses if any device returns a signal other than a non-shared signal as its local response signal, since it may be necessary for all the devices to see the WRITE memory access request before a requesting device can assume sole ownership of the cache line. Retry signals therefore may not be ignored in this case.

By immediately returning a prioritized response signal prior to receiving all local response signals in the situations described above, memory access times may be reduced by several bus cycles. Therefore, in addition to eliminating the extra bus traffic and otherwise shortening the access time that would otherwise occur as a result of an extraneous retry signal, many embodiments of the invention also speed memory access through this "predictive" implementation of the snoop response collection logic.

It should be appreciated that the logic described in Table III may be extended to handle any number of snooper devices. Moreover, it should be appreciated that it is well within the abilities of one of ordinary skill in the art to implement the functionality of any of Tables I–III, or any variations thereof that are described herein, into a hardware implementation of a snoop response collection logic circuit.

Figure 6:
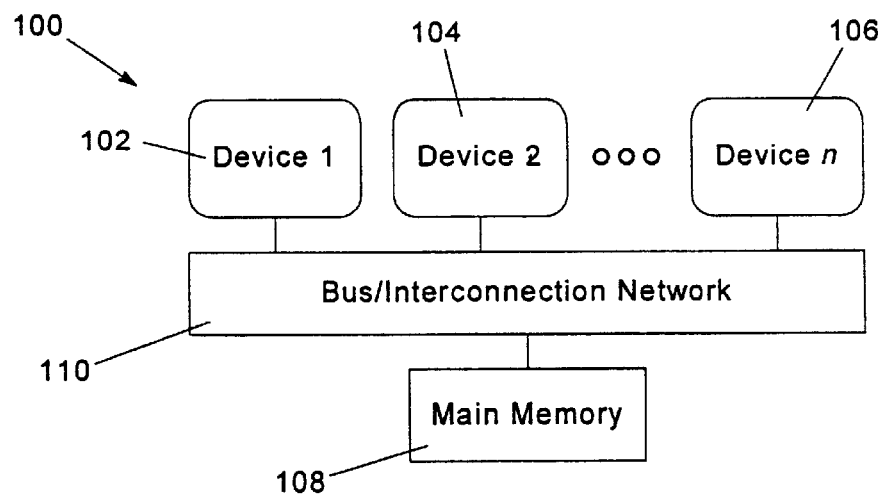
FIG. 6 is a block diagram of a first shared memory environment suitable for use consistent with the invention, utilizing a shared main memory architecture.
Figure 7:
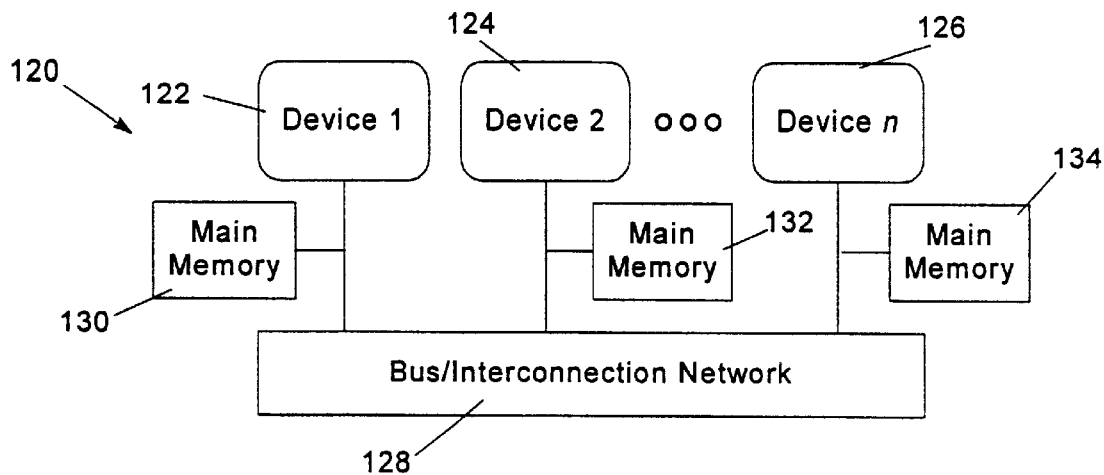
FIG. 7 is a block diagram of a second shared memory environment suitable for use consistent with the invention, utilizing a distributed and shared memory architecture.
Figure 8:
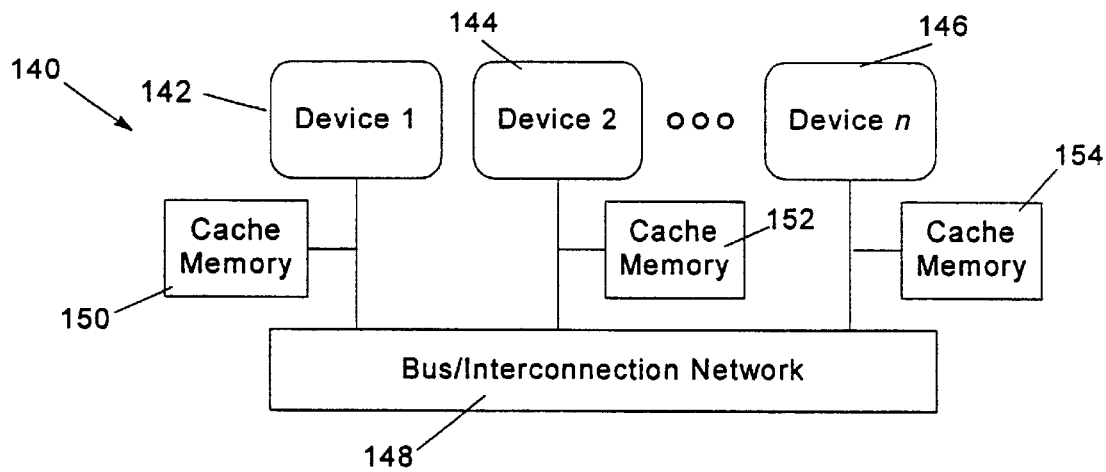
FIG. 8 is a block diagram of a third shared memory environment suitable for use consistent with the invention, utilizing a cache-only memory access (COMA) memory architecture.

The snoop coherence mechanism described herein may be utilized in a number of "shared" memory systems consistent with the invention. In addition to that illustrated in connection with FIG. 1 above, several other suitable environments are illustrated in FIGS. 6–8. For example, a data processing system 100 shown in FIG. 6 may include a plurality of snooper devices 102, 104 and 106 that are coupled to a main memory 108 through a bus/interconnection network 110. Data processing system 100 is an example of a memory system architecture whereby all devices share a common main memory, and thus, coherence must be maintained between any of the memories in devices 102, 104 and 106.

FIG. 7 illustrates an example of another data processing system 120 implementing a distributed and shared memory system architecture. System 120 includes a plurality of snooper devices 122, 124 and 126 that are interconnected with one another via a bus/interconnection network 128. However, rather than sharing a common main memory, each device has associated therewith its own portion of a main memory, e.g., main memory 130 for device 122, main memory 132 for device 124 and main memory 134 for device 126. A variation of this distributed and shared memory architecture is illustrated by data processing system 140 of FIG. 8, where a plurality of snooper devices 142, 144 and 146 are interconnected with one another via a bus/interconnection network 148, and with each including an associated cache memory 150, 152 and 154 that replaces the main memory of data processing system 120. Data processing system 140 is an example of a cache only memory access (COMA) memory system architecture, the operation of which is well known in the art.

Figure 9:
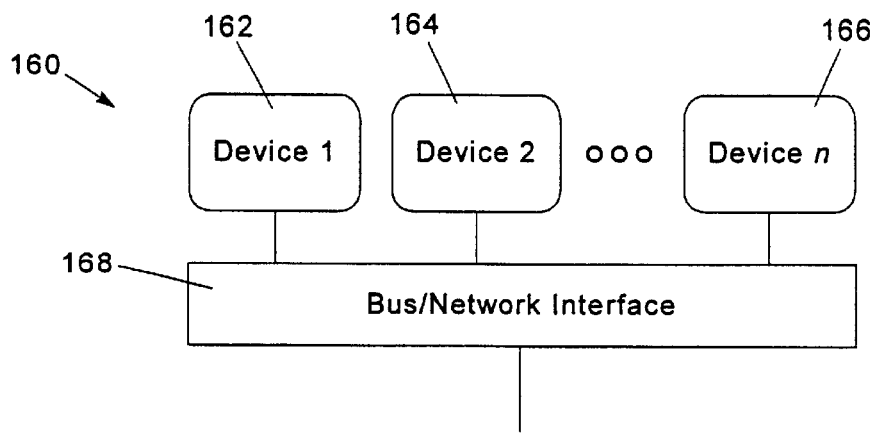
FIG. 9 is a block diagram of an integrated circuit device implementing multiple snoop devices consistent with the invention.

As discussed above, snoopy coherence may also be implemented in a multi-level format, whereby multiple snooper devices may be integrated into a given electronic device or integrated circuit device therein to maintain coherence between a plurality of memories integrated in such a device. FIG. 9 illustrates, for example, a circuit arrangement 160 representing a single integrated circuit device within which may be defined multiple snooper devices 162, 164 and 166 that are interfaced with a bus/network interface block 168. Circuit arrangement 160 of FIG. 9, is, for example, similar in architecture to CPU 14 of FIG. 1. It should be appreciated that circuit arrangement 160 may thus be used in any of the snooper devices in any of data processing systems 100, 120 or 140 of FIGS. 6–8 to provide such a multi-level snoopy coherence mechanism.

Various additional modifications may be made to the illustrated embodiments without departing from the spirit and scope of the invention. Therefore, the invention lies in the claims hereinafter appended.

What is claimed is:

1. A circuit arrangement for maintaining coherence between a plurality of snooper devices coupled to one another over a shared memory interface, the circuit arrangement comprising:

(a) snoop logic associated with the plurality of snooper devices and configured to generate a plurality of local response signals in response to an access request for a selected memory address, each local response signal associated with the state of the selected memory address in a snooper device among the plurality of snooper devices, and the snoop logic further configured to generate a retry signal as the local response signal for a selected snooper device among the plurality of snooper devices when the snoop logic is unable to determine the state of the selected memory address in the selected snooper device; and (b) response collection logic, coupled to receive the plurality of local response signals generated by the snoop logic, the response collection logic configured to generate a prioritized response signal representative of a highest priority local response signal among the plurality of local response signals, and the response collection logic further configured to disregard any extraneous retry signal when generating the prioritized response signal.

2. The circuit arrangement of claim 1, wherein the plurality of snooper devices includes at least one cache memory.

3. The circuit arrangement of claim 2, wherein the snoop logic is configured to output a cached signal as the local response signal for a selected cache memory when a selected cache line associated with the selected memory address requested in the access request is cached in the selected cache memory, and to output a non-cached signal as the local response signal for the selected cache memory when the selected cache line is not cached in the selected cache memory.

4. The circuit arrangement of claim 3, wherein the response collection logic is configured to output a cached signal as the prioritized response signal whenever any of the plurality of local response signals is a cached signal.

5. The circuit arrangement of claim 4, wherein the cached signal is a non-shared signal if the selected cache line is only stored in the selected cache memory, and is a shared signal if the selected cache line is also stored in another of the plurality of snooper devices.

6. The circuit arrangement of claim 5, wherein the cached signal is a modified signal if the selected cache line is only stored in the selected cache memory and the copy of the selected cache line in the selected cache memory differs from that stored in a shared memory coupled to the shared memory interface.

7. The circuit arrangement of claim 6, wherein the cached signal is an exclusive signal if the selected cache line is only stored in the selected cache memory and the copy of the selected cache line in the selected cache memory is the same as that stored in the shared memory.

8. The circuit arrangement of claim 5, wherein the response collection logic is configured to output the prioritized response signal prior to receiving all local response signals upon receipt of a non-shared signal from the snoop logic.

9. The circuit arrangement of claim 8, wherein the response collection logic is further configured to wait to output the prioritized response signal until after receiving all local response signals if each local response signal received from the snoop logic is a retry signal or a non-cached signal.

10. The circuit arrangement of claim 8, wherein the response collection logic is further configured to output the prioritized response signal prior to receiving all local response signals upon receipt of a shared signal from the snoop logic if the access request will not modify the contents of the selected cache line.

11. The circuit arrangement of claim 10, wherein the response collection logic is further configured to wait to output the prioritized response signal until after receiving all local response signals if each local response signal received from the snoop logic is a retry signal, a non-cached signal, or a shared signal if the access request will modify the contents of the selected cache line.

12. The circuit arrangement of claim 1, wherein the snoop logic and response collection logic are disposed on the same integrated circuit device.

13. The circuit arrangement of claim 1, wherein the snoop logic and response collection logic are disposed on different integrated circuit devices.

14. The circuit arrangement of claim 13, wherein the snoop logic includes a plurality of snoop logic circuits respectively associated with the plurality of snooper devices, and wherein the response collection logic includes:

(a) a plurality of chip response collection logic circuits, each chip response collection logic circuit disposed on one of a plurality of integrated circuit devices, and each chip response collection logic circuit configured to output a prioritized chip response signal representative of a highest priority local response signal among at least one local response signal output by at least one snoop logic circuit disposed on the same integrated circuit device as the chip response collection logic circuit; and (b) a system response collection logic circuit configured to output as the prioritized response signal a prioritized system response signal representative of a highest priority prioritized chip response signal among the plurality of prioritized chip response signals.

15. A data processing system comprising the circuit arrangement of claim 1.

16. A program product embodied on a computer-readable medium for maintaining coherence between a plurality of snooper devices coupled to one another over a shared memory interface, the program product comprising:

(a) snoop logic =associated with the plurality of snooper devices and configured to generate a plurality of local response signals in response to an access request for a selected memory address, each local response signal associated with the state of the selected memory address in a snooper device among the plurality of snooper devices, and the snoop logic further configured to generate a retry signal as the local response signal for a selected snooper device among the plurality of snooper devices when the snoop logic is unable to determine the state of the selected memory address in the selected snooper (b) response collection logic, coupled to receive the plurality of local response signals generated by the snoop logic, the response collected logic configured to generate a prioritized response signal representative a highest priority local response signal among the plurality of local response signals, and the response collection logic further configured to disregard any extraneous retry signal when generating the prioritized response signal.

17. The program product of claim 16, wherein the computer-readble medium is transmission type media.

18. The program product of claim 16, wherein the computer-readble medium is recordable media.

19. A circuit arrangement for maintaining coherence between a plurality of snooper devices coupled to one another over a shared memory interface, the circuit arrangement comprising:

(a) snoop logic associated with the plurality of snooper devices and configured to generate a plurality of local response signals in response to an access request for a selected memory address, each local response signal indicating one of a plurality of states for the selected memory address in an associated snooper device among the plurality of snooper devices, the plurality of states including a non-shared state that indicates that the selected memory address is cached solely in the associated snooper device, a retry state that indicates that the snoop logic is unable to determine the state of the selected memory address in the associated snooper device, and a non-cached state that indicates that the selected memory address is not cached in the associated snooper device; and (b) response collection logic, coupled to receive the local response signals generated by the snoop logic in response to the access request, the response collection logic configured to generate a prioritized response signal indicating a highest priority state among the states of the local response signals generated in response to the access request, wherein the non-shared state has a higher priority than the retry state, and the retry state has a higher priority than the non-cached state.

20. The circuit arrangement of claim 19, wherein the plurality of states further includes a shared state that indicates that the selected memory address is cached in the associated snooper device as well as in another of the plurality of snooper devices.

21. The circuit arrangement of claim 20, wherein the response collection logic is configured to grant a higher priority to the shared state than the retry state if the access request will not modify the contents of the selected memory address.

22. The circuit arrangement of claim 20, wherein the response collection logic is configured to grant a lower priority to the shared state than the retry state if the access request will modify the contents of the selected memory address.

23. The circuit arrangement of claim 19, wherein the response collection logic is configured to output the prioritized response signal prior to receiving all local response signals upon receipt of a local response signal with a non-shared state from the snoop logic.

24. The circuit arrangement of claim 23, wherein the response collection logic is further configured to wait to output the prioritized response signal until after receiving all local response signals if each local response signal received from the snoop logic has a retry state or a non-cached state.

25. The circuit arrangement of claim 24, wherein the plurality of states further includes a shared state that indicates that the selected memory address is cached in the associated snooper device as well as in another of the plurality of snooper devices, wherein the response collection logic is configured to output the prioritized response signal prior to receiving all local response signals upon receipt of a local response signal with a shared state from the snoop logic if the access request will not modify the contents of the selected memory address, and wherein the response collection logic is further configured to wait to output the prioritized response signal until after receiving all local response signals if each local response signal received from the snoop logic has a retry state, a shared state or a non-cached state and the access request will modify the contents of the selected memory address.

26. A method of maintaining coherence between a plurality of snooper devices coupled to one another over a shared memory interface, the method comprising:
   (a) in response to receipt of an access request for a selected memory address, generating a plurality of local response signals, each local response signal associated with the state of the selected memory address in a snooper device among the plurality of snooper devices, wherein generating the plurality of local response signals includes generating a retry signal as the local response signal for a selected snooper device among the plurality of snooper devices when the state of the selected memory address in the selected snooper device cannot be determined; and
   (b) generating a prioritized response signal representative of a highest priority local response signal among the plurality of local response signals, including disregarding any extraneous retry signal when generating the prioritized response signal.

27. The method of claim 26, wherein the plurality of snooper devices includes at least one cache memory, and wherein generating the plurality of local response signals further includes:
   (a) generating a cached signal as the local response signal for a selected cache memory when a selected cache line associated with the selected memory address requested in the access request is cached in the selected cache memory; and
   (b) generating a non-cached signal as the local response signal for the selected cache memory when the selected cache line is not cached in the selected cache memory.

28. The method of claim 27, wherein generating the prioritized response signal includes generating a cached signal as the prioritized response signal whenever any of the plurality of local response signals is a cached signal.

29. The method of claim 28, wherein the cached signal is a non-shared signal if the selected cache line is only stored in the selected cache memory, and is a shared signal if the selected cache line is also stored in another of the plurality of snooper devices.

30. The method of claim 29, wherein the cached signal is a modified signal if the selected cache line is only stored in the selected cache memory and the copy of the selected cache line in the selected cache memory differs from that stored in a shared memory coupled to the shared memory interface.

31. The method of claim 30, wherein the cached signal is an exclusive signal if the selected cache line is only stored in the selected cache memory and the copy of the selected cache line in the selected cache memory is the same as that stored in the shared memory.

32. The method of claim 29, wherein generating the prioritized response signal finer includes outputting the prioritized response signal prior to receiving all local response signals upon receipt of a non-shared signal as one of the plurality of local response signals.

33. The method of claim 32, wherein generating the prioritized response signal further includes waiting to output the prioritized response signal until after receiving all local response signals if each generated local response signal is a retry signal or a non-cached signal.

34. The method of claim 32, wherein generating the prioritized response signal further includes outputting the prioritized response signal prior to receiving all local response signals upon receipt of a shared signal as one of the plurality of local response signals if the access request will not modify the contents of the selected cache line.

35. The method of claim 34, wherein generating the prioritized response signal further includes waiting to output the prioritized response signal until after receiving all local response signals if each received local response signal is a retry signal, a non-cached signal, or a shared signal if the access request will modify the contents of the selected cache line.

36. A method of maintaining coherence between a plurality of snooper devices coupled to one another over a shared memory interface, the method comprising:
   (a) in response to receipt of an access request for a selected memory address, generating a plurality of local response signals, each local response signal indicating one of a plurality of states for the selected memory address in an associated snooper device among the plurality of snooper devices, the plurality of states including a non-shared state that indicates that the selected memory address is cached solely in the associated snooper device, a retry state that indicates that the snoop logic is unable to determine the state of the selected memory address in the associated snooper device, and a non-cached state that indicates that the selected memory address is not cached in the associated snooper device; and (b) generating a prioritized response signal indicating a highest priority state among the states of the local response signals generated in response to the access request, wherein the non-shared state has a higher priority than the retry state, and the retry state has a higher priority than the non-cached state.

37. The method of claim 36, wherein the plurality of states further includes a shared state that indicates that the selected memory address is cached in the associated snooper device as well as in another of the plurality of snooper devices, wherein the shared state has a higher priority than the retry state if the access request will not modify the contents of the selected memory address, and wherein the shared state has a lower priority than the retry state if the access request will modify the contents of the selected memory address.

38. The method of claim 36, wherein generating the prioritized response signal includes outputting the prioritized response signal prior to receiving all local response signals upon receipt of a local response signal with a non-shared state.

39. The method of claim 38, wherein generating the prioritized response signal further includes waiting to output the prioritized response signal until after receiving all local response signals if each generated local response signal has a retry state or a non-cached state.

* * * * *

UNITED STATES PATENT AND TRADEMARK OFFICE
CERTIFICATE OF CORRECTION

PATENT NO. : 6,351,791 B1
DATED : February 26, 2002
INVENTOR(S) : Donald Lee Freerksen; Gary Michael Lippert and Farnaz Mounes-Toussi It is certified that error appears in the above-identified patent and that said Letters Patent is hereby corrected as shown below:

<u>Column 16,</u>
Line 4, delete "maintaining".
Line 4, after "for" insert -- defining a circuit arrangement that maintains --.
Line 6, after "interface," insert -- the circuit arrangement defined by --.
Line 7, "=associated" should be -- associated --.
Line 18, after "snooper" insert -- device; and --.
Line 22, after "representative" insert -- of --.
Line 29, "computer-readble" should be -- computer-readable --.
Line 31, "computer-readble" should be -- computer-readable --.

Signed and Sealed this

Tenth Day of September, 2002

*Attest:*

JAMES E. ROGAN
*Director of the United States Patent and Trademark Office*

*Attesting Officer*